CURTIS, ROBERTS & CURTIS.
Horse Rake.

No. 57,482. Patented Aug. 28, 1866.

UNITED STATES PATENT OFFICE.

A. J. CURTIS AND D. J. ROBERTS, OF SWANVILLE, AND W. CURTIS, OF MONROE, MAINE.

IMPROVEMENT IN HORSE-RAKES.

Specification forming part of Letters Patent No. 57,482, dated August 28, 1866.

*To all whom it may concern:*

Be it known that we, ANDREW J. CURTIS and DANIEL J. ROBERTS, of Swanville, and WALDO CURTIS, of Monroe, in the county of Waldo and State of Maine, have invented a new and useful Improvement in what are termed "Horse-Rakes;" and we do hereby declare the same to be fully described in the following specification and represented in the accompanying drawings, of which—

Figure 1:
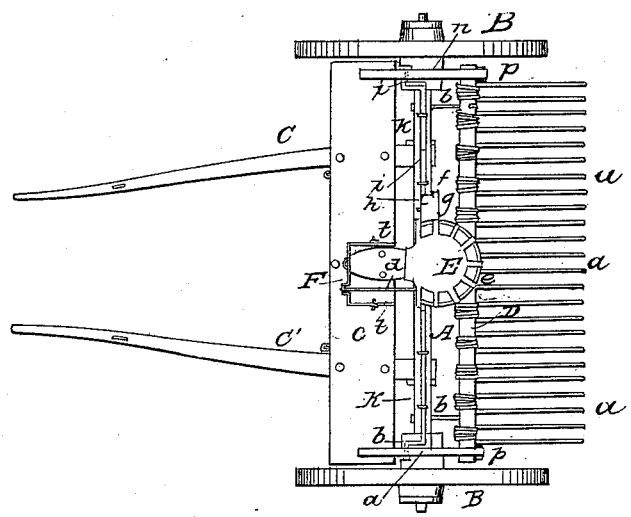
Figure 2:
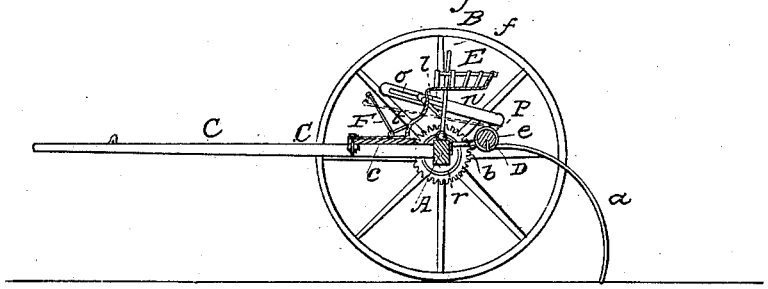

Figure 1 is a top view, and Fig. 2 a vertical section, of a horse-rake made in accordance with our invention.

In the said drawings, A is the axle, B B the wheels, and C C the thills, of the rake. D is the rake-head, provided with a series of teeth, $a\ a\ a$, and hinged to arms $b\ b$, projecting from the axle. E is the driver's seat; and F is a movable foot-rest or lever, which is hinged to the platform $c$ of the thills, is formed and arranged as shown in the drawings, and is connected with the rake-head by a rod, $d$, which is hooked into a staple, $e$, projecting from the rear part of the rake-head. The driver, by forcing his foot against the foot-rest F, can produce a rotary motion of the rake sufficient to raise the teeth thereof a short distance off the ground; but should he be prevented from doing this by the hay gathered on the rake, or should he prefer to cause the machine to do this, in order to pass the rake over a windrow, he can apply his hand to an arm or shipper, $f$, and force it out of the notch $g$ of its holder $h$, which projects from the seat. The said arm $f$ projects upward from a shaft, $i$, arranged on the axle, and so as to turn in bearings $k\ k$ projecting therefrom. This shaft has cranked arms $l\ l$ extending from its extremities and passing into slots formed in two toothed rack-bars, $n\ n$, such bars being arranged as represented, and each being provided with a slot, $o$, to receive the wrist of the crank. Each of such rack-bars is hinged at its rear end to an arm, $p$, projecting up from the rake-head. Furthermore, each rack-bar has a toothed rack, $q$, applied to its lower side and directly over a gear, $r$, fixed to the hub of the next adjacent wheel, B.

From the above it will be seen that, while the rake is in the act of being drawn along over the surface of the ground, the driver, by laying hold of and moving the arm $f$, can cause the racks of the two rack-bars to be brought into engagement with the gears of the wheels, in which case the said gears will so move the bars as to cause the rake-head to turn and elevate its teeth off the ground. As this elevation of the rake can only be effected while the wheels may be in revolution, the raising of the rake-head while the machine is at rest may be accomplished by the application of the foot to the rest F, so as to move the same forward. This foot-rest serves to ease the rake while turning around, or while being backed.

An arm or treadle, $t$, projects from the lower part of the foot-rest and serves as a means of enabling the driver to keep the rake down upon the ground with sufficient force, as by pressing his foot on such arm he can cause the rake-teeth to be pressed down upon the ground.

What we claim as our invention is—

The arrangement and combination of the gears on the wheels with the rack-bars and their operative mechanism, as described, applied to the rake-head and the axle, the whole being substantially as specified.

ANDREW J. CURTIS.
     DANIEL J. ROBERTS.
     WALDO CURTIS.

Witnesses:
 H. M. SMITH,
 WM. WHITTEN.